US012731372B2

(12) United States Patent
Bleyer et al.

(10) Patent No.: US 12,731,372 B2
(45) Date of Patent: Sep. 8, 2026

(54) SYSTEMS AND METHODS FOR SELECTING MOTION MODELS FOR ALIGNING SCENE CONTENT CAPTURED BY DIFFERENT IMAGE SENSORS

(71) Applicant: Microsoft Technology Licensing, LLC, Redmond, WA (US)

(72) Inventors: Michael Bleyer, Seattle, WA (US); Pascal Paré, Bothell, WA (US); Paul Lee, Redmond, WA (US); Aleksander Bogdan Bapst, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 18/306,671

(22) Filed: Apr. 25, 2023

(65) Prior Publication Data

US 2024/0362891 A1 Oct. 31, 2024

(51) Int. Cl.

| | |
|---|---|
| ***G06V 10/74*** | (2022.01) |
| ***G06V 10/25*** | (2022.01) |
| ***G06V 10/44*** | (2022.01) |

(52) U.S. Cl.
CPC ............ *G06V 10/761* (2022.01); *G06V 10/25* (2022.01); *G06V 10/44* (2022.01)

(58) Field of Classification Search
CPC ...... G06V 10/761; G06V 10/25; G06V 10/44; G06T 7/38; G06T 7/337
See application file for complete search history.

(56) References Cited

U.S. PATENT DOCUMENTS

| | | | | |
|---|---|---|---|---|
| 10,262,426 | B2 | 4/2019 | Holzer | |
| 2003/0016853 | A1* | 1/2003 | Oosawa | G06V 10/754 382/209 |
| 2004/0091171 | A1 | 5/2004 | Bone | |
| 2018/0350085 | A1* | 12/2018 | Lu | G06T 11/60 |
| 2021/0352323 | A1 | 11/2021 | Sugio et al. | |
| 2022/0028092 | A1* | 1/2022 | Bleyer | G06T 7/292 |
| 2022/0028093 | A1* | 1/2022 | Sinha | G06T 7/292 |
| 2022/0028094 | A1* | 1/2022 | Bleyer | G06T 5/73 |

(Continued)

OTHER PUBLICATIONS

International Search Report and Written Opinion received for PCT Application No. PCT/US2024/032305, mailed on Feb. 13, 2025, 18 pages.

(Continued)

*Primary Examiner* — Vu Le
*Assistant Examiner* — Rachel Anne Ometz
(74) *Attorney, Agent, or Firm* — Workman Nydegger

(57) ABSTRACT

A system for selecting motion models for aligning scene content captured by different image sensors, is configurable to (i) access a first image captured by a first image sensor and a second image captured by a second image sensor; (ii) access a set of motion models; (iii) define a reference patch within the second image; (iv) generate a respective match patch for each motion model of the set of motion models; (v) determine a similarity between each respective match patch and the reference patch within the second image; (vi) select a final motion model from the set of motion models based upon the similarity between each respective match patch and the reference patch within the second image; and (vii) utilize the final motion model to generate an output image for display to a user.

20 Claims, 17 Drawing Sheets

(56) References Cited

U.S. PATENT DOCUMENTS

| | | | | |
|---|---|---|---|---|
| 2022/0028095 | A1* | 1/2022 | Bleyer | G06T 19/006 |
| 2022/0148198 | A1 | 5/2022 | Kobayashi | |
| 2022/0385817 | A1 | 12/2022 | Leu | |
| 2023/0090275 | A1* | 3/2023 | Konolige | G06V 10/761 |
| 2023/0215026 | A1 | 7/2023 | Du | |
| 2024/0062412 | A1 | 2/2024 | Hehn | |
| 2024/0324852 | A1 | 10/2024 | Bouhnik | |
| 2024/0362802 | A1 | 10/2024 | Bleyer | |
| 2024/0378733 | A1 | 11/2024 | Driscoll | |

OTHER PUBLICATIONS

Final Office Action mailed on May 29, 2025, in U.S. Appl. No. 18/306,682, 16 Pages.
International Search Report and Written Opinion received for PCT Application No. PCT/US2024/031146, mailed on Dec. 19, 2024, 12 pages.
Invitation to Pay Additional Fees Issued in PCT Application No. PCT/US2024/032305, Mailed on Dec. 23, 2024, 16 Pages.
Lee, et al., "Attentive and Contrastive Learning for Joint Depth and Notion Field Estimation", In Repository of arXiv:2110.06853v1, Oct. 13, 2021, 10 pages.
Non-Final Office Action mailed on Jan. 30, 2025, in U.S. Appl. No. 18/306,682, 14 Pages.
Strintzis, et al., "Object-Based Coding of Stereoscopic and 3D Image Sequences", IEEE Signal Processing Magazine, vol. No. 16, Issue No. 3, May 1, 1999, pp. 14-28.
Non-Final Office Action mailed on Aug. 6, 2025, in U.S. Appl. No. 18/306,682, 16 pages.
Final Office Action mailed on Dec. 2, 2025, in U.S. Appl. No. 18/306,682, 17 pages.
International Preliminary Report on Patentability (Chapter I) received for PCT Application No. PCT/US2024/031146, mailed on Nov. 6, 2025, 8 pages.
International Preliminary Report on Patentability (Chapter I) received for PCT Application No. PCT/US2024/032305, mailed on Nov. 6, 2025, 12 pages.
Non-Final Office Action mailed on Feb. 24, 2026, in U.S. Appl. No. 18/306,682, 18 pages.
U.S. Appl. No. 18/306,682, filed Apr. 25, 2023.
Notice of Allowance mailed Jul. 10, 2026, in U.S. Appl. No. 18/306,682, 16 pages.

* cited by examiner

800

SYSTEMS AND METHODS FOR SELECTING MOTION MODELS FOR ALIGNING SCENE CONTENT CAPTURED BY DIFFERENT IMAGE SENSORS

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Some MR systems include one or more cameras and utilize images and/or depth information obtained using the camera(s) to provide pass-through views of a user's environment to the user. A pass-through view can aid users in avoiding disorientation and/or safety hazards when transitioning into and/or navigating within a mixed-reality environment. Pass-through views may also enhance user views in low visibility environments. For example, mixed-reality systems configured with long wavelength thermal imaging cameras may facilitate visibility in smoke, haze, fog, and/or dust. Likewise, mixed-reality systems configured with low light imaging cameras facilitate visibility in dark environments where the ambient light level is below the level required for human vision.

An MR system may provide pass-through views in various ways. For example, an MR system may present raw images captured by the camera(s) of the MR system to a user. In other instances, an MR system may modify and/or reproject captured image data to correspond to the perspective of a user's eye to generate pass-through views. An MR system may modify and/or reproject captured image data to generate a pass-through view using depth information for the captured environment obtained by the MR system (e.g., using a depth system of the MR system, such as a time of flight camera, a rangefinder, stereoscopic depth cameras, etc.). In some instances, an MR system utilizes one or more predefined depth values to generate pass-through views (e.g., by performing planar reprojection).

In some instances, pass-through views generated by modifying and/or reprojecting captured image data may at least partially correct for differences in perspective brought about by the physical separation between a user's eyes and the camera(s) of the MR system (known as the "parallax problem," "parallax error," or, simply "parallax"). Such pass-through views/images may be referred to as "parallax-corrected pass-through" views/images. By way of illustration, parallax-corrected pass-through images may appear to a user as though they were captured by cameras that are co-located with the user's eyes.

MR systems are often used in combination with other devices that are physically independent from and/or untethered to the MR system (e.g., controllers, instruments, etc.). For example, a user may operate an MR system while also operating a handheld/wearable device that includes a device camera. The device camera may be configured to be directed at and/or capture portions of the environment that are within the field of view of the MR system, such that both the device camera and cameras of the MR system concurrently capture portions of the environment.

The subject matter claimed herein is not limited to embodiments that operate only in environments such as those described above. Rather, this background is only provided to illustrate one example technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Disclosed embodiments are generally directed to systems, methods, and apparatuses for determining and/or selecting motion models for aligning scene content captured by different image sensors.

Example Systems and Components

Figure 1:
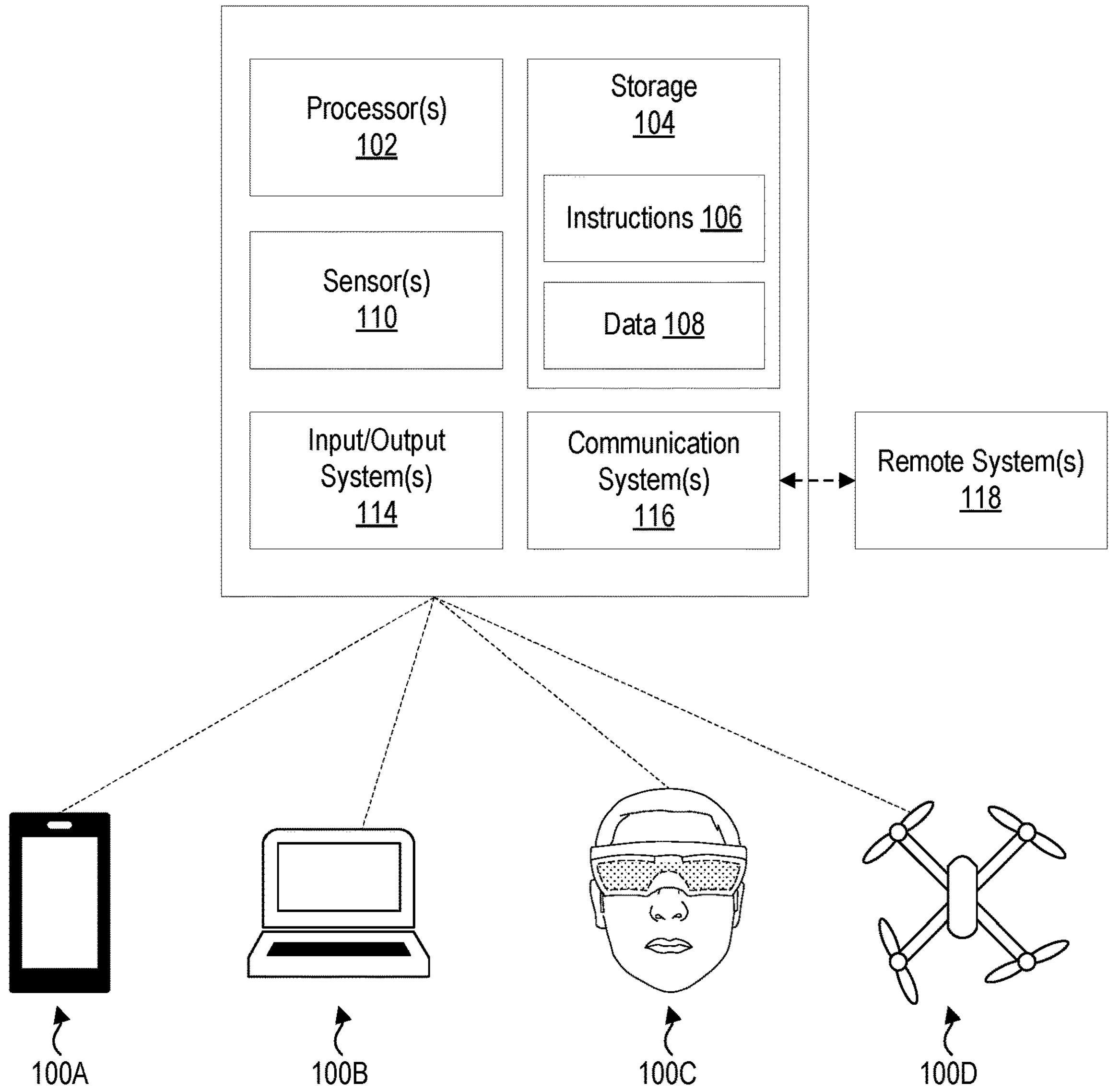
FIG. 1 illustrates example components of an example system that may include or be used to implement one or more disclosed embodiments.

FIG. 1 illustrates various example components of a system 100 that may be used to implement one or more disclosed embodiments. For example, FIG. 1 illustrates that a system 100 may include processor(s) 102, storage 104, sensor(s) 110, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more radar sensors (as will be described in more detail hereinbelow), image sensors, microphones, thermometers, barometers, magnetometers, accelerometers, gyroscopes, and/or others.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), other devices (e.g., self-driving vehicles), combinations thereof, etc. A system 100 may take on other forms in accordance with the present disclosure.

Examples of Technical Benefits, Improvements, and Practical Applications

As noted above, MR systems are often used in combination with other devices that are physically independent from and/or untethered to the MR system (e.g., controllers, instruments, etc.). For example, a user may operate an MR system while also operating a handheld/wearable device that includes a device camera. The device camera may be configured to be directed at and/or capture portions of the environment that are within the field of view of the MR system, such that both the device camera and cameras of the MR system concurrently capture portions of the environment.

User experiences may be enhanced by providing composite pass-through images on an MR system based upon camera imagery captured by a separate device camera aligned with camera imagery captured by the camera(s) of the MR system. However, because MR system cameras and separate device cameras move independently of one another, accurately aligning the camera imagery of the separate cameras to generate such composite pass-through images is associated with many challenges, particularly in real-time and/or near-real-time implementations.

Some systems align an image captured by a separate device camera with an image captured by an HMD camera by extracting features from both images, determining feature correspondences between the images using the extracted features, and using the feature correspondences to compute a motion model that is usable to map pixels from one image onto the other (e.g., to map pixels from the separate device image to the HMD image). Motion models may be regularly updated/computed to facilitate continuous alignment of the imagery captured by the different cameras. For instance, a representation of the portion of the scene being captured by the separate device camera may be continuously depicted on the HMD using continuously updated motion models.

Figure 2:
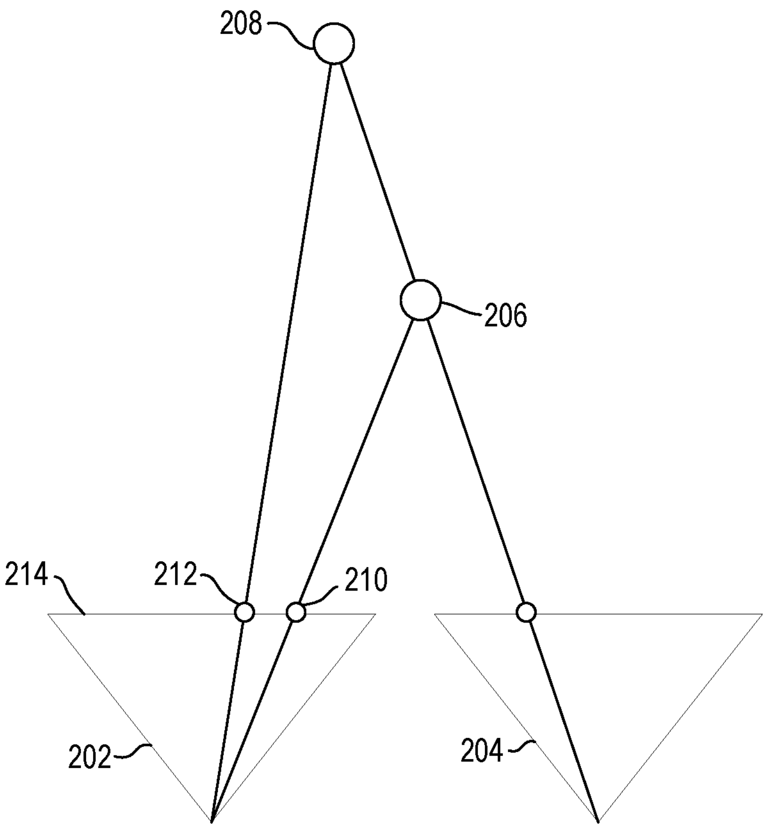
FIG. 2 illustrates a conceptual representation of an HMD camera and a separate camera simultaneously capturing objects at different depths within a scene.

As noted above, MR system cameras and separate device cameras are positionally offset from one another and move independently of one another. FIG. 2 provides a conceptual representation of an HMD camera 202 and a separate camera 204, which are positionally offset from one another. FIG. 2 also depicts a foreground object scene point 206 and a background object scene point 208 within a scene, which are both captured by the separate camera 204 (as indicated by the line extending from the camera center of the separate camera 204 to the foreground object scene point 206 and the background object scene point 208).

Because of the different scene depths of the foreground object scene point 206 and the background object scene point 208, a depiction of the portion of the scene being captured by the separate camera 204 could be placed at different positions 210 and 212 of the image plane 214 of the HMD camera 202, depending on whether the foreground object scene point 206 or the background object scene point 208 has greater influence on the motion model used to generate the depiction (of the portion of the scene being captured by the separate camera 204 on HMD imagery or field of view).

As a motion model is continuously updated to facilitate alignment of imagery captured by a separate camera 204 and an HMD camera 202, the influence of (the features of) different objects at different scene depths on the computation of the motion model can change. For instance, at one timepoint, a foreground object of which the foreground object scene point 206 is a part can contribute a greater number of feature correspondences to the motion model computation, causing depictions of the scene portion captured by the separate camera 204 on the HMD imagery or field of view to be biased toward position 210. At a different timepoint, a background object of which the background object scene point 208 is a part can contribute a greater number of feature correspondences to the motion model computation, causing depictions of the scene portion captured by the separate camera 204 on the HMD imagery or field of view to be biased toward position 212.

Such changes in the contributions of different objects at different depths to the motion model computation can result in abrupt disruptions to the positioning of depictions of the scene content captured by the separate camera 204 on the HMD imagery or field of view. In some instances, foreground objects and backgrounds objects rapidly alternate in providing the greater contribution to the motion model computation, which can result in rapid oscillations of depictions of the scene content captured by the separate camera 204 on the HMD imagery or field of view (e.g., rapid oscillation between positions 210 and 212). Such disruptions and/or oscillations can undermine user experiences by introduction of distracting artifacts.

At least some disclosed embodiments are directed to utilizing different subsets of feature correspondences from imagery captured by different cameras (e.g., an HMD camera and a separate camera) to generate different motion models for the same timepoint. For example, parameters of one motion model may be generated primarily based upon feature correspondences of one or more objects at a first depth (e.g., in the foreground), whereas parameters of a second motion model may be generated primarily based upon feature correspondences of one or more objects at a second depth (e.g., in the background). Providing alternative motion models for an image pair associated with a single timepoint may enable a system to overlay different depictions of scene content captured in one a separate camera image onto an HMD image (or field of view), where the different depictions are focused on different objects at different depths in the separate camera image (e.g., foreground vs background objects).

At least some disclosed embodiments involve selecting from among multiple available motion models to generate output imagery based upon temporal data (e.g., a previous motion model) and/or based upon indications of an object of focus or interest in the separate camera imagery (e.g., scene content in a central region of the separate camera image). Such functionality may beneficially reduce distracting oscillation artifacts in output imagery depicting scene content captured by multiple cameras (e.g., by enforcing temporal consistency) and/or may improve the accuracy of such output images (e.g., by focusing depictions of commonly captured scene content on the scene content in a particular region of one of the camera images).

Although many examples discussed herein focus on depicting scene content captured in a separate camera image (e.g., of separate camera 204) on an HMD image of field of view (e.g., of HMD camera 202), the principles disclosed herein may be applied to align content captured by any reference camera with content captured by any match camera. Accordingly, any reference included herein to an HMD camera, separate camera, first camera, second camera, match camera, reference camera, etc. are interchangeable and can refer to any type of camera of any multi-camera system.

Figure 3:
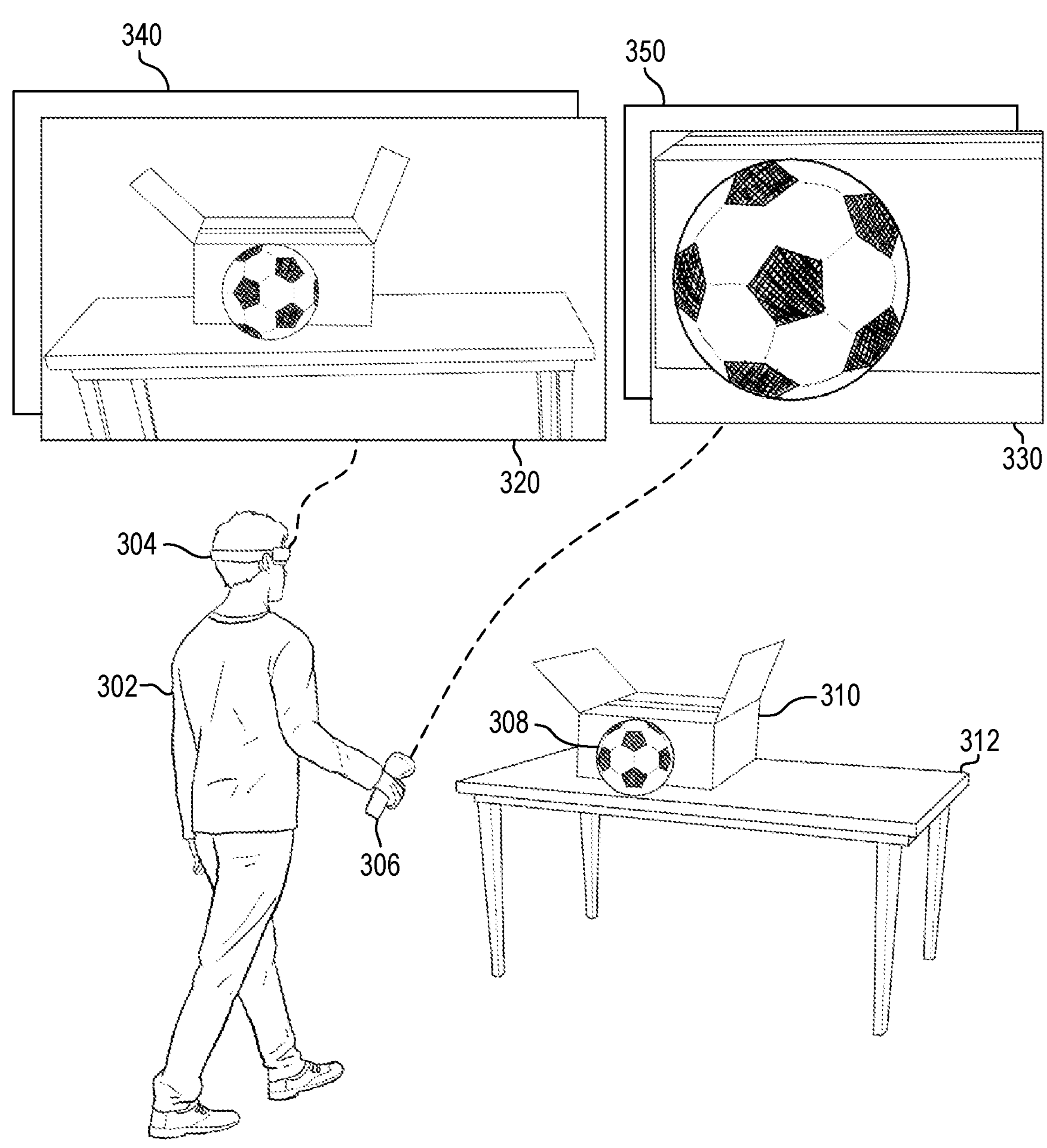
FIG. 3 illustrates an example operational environment in which an HMD camera and a separate camera capture objects at different depths within a scene.

Determining Motion Models for Aligning Scene Content Captured by Different Image Sensors FIG. 3 illustrates an example operational environment in which a user 302 operates an HMD 304 and a user instrument 306 to participate in a mixed reality experience. In the example of FIG. 3, the user instrument 306 comprises a handheld controller configured for use in conjunction with the HMD 304. Any type of user instrument is within the scope of the present disclosure.

In the example of FIG. 3, the HMD 304 and the user instrument 306 each include respective image sensors that are configured to capture images of the environment in which the user 302 is positioned. For instance, FIG. 3 illustrates image 320 captured by an image sensor of the HMD 304 and image 330 captured by an image sensor of the user instrument 306. In the example of FIG. 3, the acquisition of images 320 and 330 is performed in a temporally synchronized manner. The images 320 and 330 capture representations of a ball 308 positioned in front of a box 310 on a table 312 in the environment of the user 302. In the example of FIG. 3, the ball 308 and the box 310 are positioned at different depths within the scene relative to the image sensors of the HMD 304 and the user instrument 306, with the ball 308 positioned closer to the image sensors (e.g., in the foreground) and the box positioned further from the image sensors (e.g., in the background).

FIG. 3 furthermore depicts a preceding image 340 captured by the image sensor of the HMD 304 prior to capturing image 320. FIG. 3 also depicts a preceding image 350 captured by the image sensor of the user instrument 306 prior to capturing image 330. FIG. 3 thus indicates that the image sensors of the HMD 304 and the user instrument 306 may capture temporally consecutive image frames (e.g., video capture).

As noted above, and as will be described in more detail hereinafter, although the user instrument 306 and the HMD 304 are physically untethered from one another, disclosed embodiments may be implemented to compute one or more motion models for facilitating alignment of scene content captured by image sensors of the user instrument 306 and the HMD 304. Such motion models may be utilized to generate output imagery that depicts, highlights, overlays, or otherwise emphasizes portions of the scene captured by both image sensors.

In the following examples, the image sensor of the user instrument 306 is referred to as a reference image sensor or reference camera, with imagery captured thereby being referred to as reference imagery/reference images. Similarly, in the following examples, the image sensor of the HMD 304 is referred to as a match image sensor or match camera, with imagery captured thereby being referred to as match imagery/match images. As noted above, other camera configurations and/or uses are within the scope of the present disclosure (e.g., with the HMD camera being regarded as the reference camera and the user instrument camera being regarded as the match camera, or with cameras on other types of devices being utilized as a set of match and reference cameras).

Furthermore, although the present disclosure focuses, in at least some respects, on implementations where a single reference camera and a single match camera are used, any number of reference cameras and match cameras may be utilized in accordance with the disclosed principles (e.g., multiple reference cameras with a single match camera, multiple match cameras with a single reference camera, multiple reference cameras with multiple match cameras, etc.).

Figure 4A:
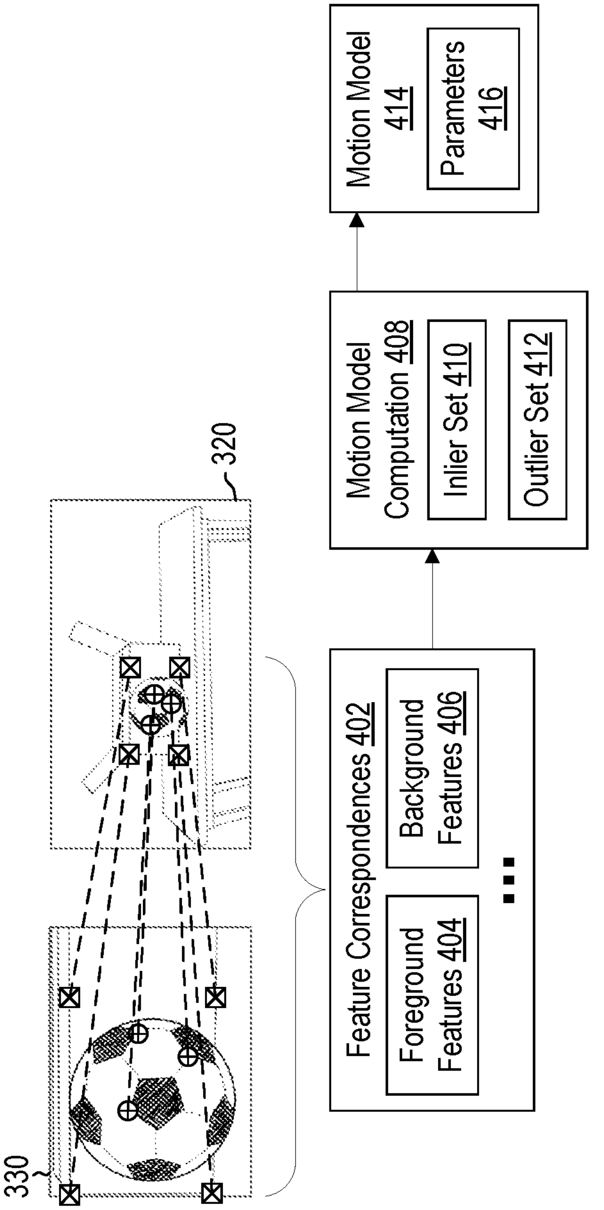
FIG. 4A illustrates a conceptual representation of generating a first motion model based upon feature correspondences from imagery captured by a reference camera and a match camera.

FIG. 4A illustrates a conceptual representation of generating a motion model based upon feature correspondences from imagery captured by different image sensors. In particular, FIG. 4A illustrates image 320 (captured by the match camera of the HMD 304) and image 330 (captured by the reference camera of the user instrument 306). FIG. 4A conceptually depicts performance of feature extraction on the images 320 and 330 to obtain feature descriptors for features of the images 320 and 330. In images 320 and 330, FIG. 4A illustrates extracted features on the ball 308 (e.g., a foreground object) via circular markers and illustrates features on the box 310 (e.g., a background object) via square markers.

Based upon the extracted feature descriptors, a system may perform descriptor matching (indicated in FIG. 4A by the dashed lines extending between corresponding features in the images 320 and 330) to obtain feature correspondences 402. The feature correspondences 402 include pairs of feature descriptors (and/or their associated image data, pixel coordinates, etc.) from the different images 320 and 330 that are determined to depict the same physical point or object in the captured scene. FIG. 4A shows that the feature correspondences 402 may be based upon foreground features 404 (e.g., of the ball 308 as represented in both images 320 and 330), background features 406 (e.g., of the box 310 as represented in both images 320 and 330), and/or any objects at any depth within the scene (indicated in FIG. 4A by the ellipsis within the feature correspondences 402).

Any suitable feature extraction technique(s) may be utilized in accordance with the present disclosure, such as, by way of non-limiting example, scale-invariant feature transform (SIFT), speeded up robust features (SURF), histogram of oriented gradients (HOG), local binary pattern (LBP), discrete wavelet transform (DWT), machine learning based approaches, and/or others. Furthermore, any suitable descriptor matching technique(s) may be utilized in accordance with the present disclosure, such as, by way of non-limiting example, Euclidean distance, hamming distance, cross-correlation, ratio testing, fast library for approximate nearest neighbors (FLANN), and/or others.

FIG. 4A conceptually depicts that a system may utilize the feature correspondences 402 to perform motion model computation 408. Motion model computation 408 may employ various techniques, such as random sample consensus (RANSAC), least-median-of-squares, maximum likelihood estimation, total least squares, Theil-Sen estimation, and/or others. In some instances, such as when the motion model computation 408 utilizes RANSAC, the motion model computation 408 involves determining an inlier set 410 of feature correspondences and an outlier set 412 of feature correspondences (e.g., from the feature correspondences 402). In some instances, the inlier set 410 and the outlier set 412 are associated with features from different objects at different depths within the scene represented by the images 320 and 330. For instance, the inlier set 410 may primarily comprise feature correspondences for features of the ball 308 (e.g., an object at one depth), and the outlier set 412 may primarily comprise feature correspondences for features associated with the box 310 (e.g., an object at another depth), or vice versa.

In one example, the inlier set 410 may be determined by randomly sampling from the input feature correspondences 402 and fitting a preliminary motion model using the randomly sampled feature correspondences that attempts to map feature points/descriptors in one image to corresponding feature points/descriptors in the other image (e.g., to map pixels from the reference image 330 to the match image 320). The remaining feature correspondences 402 may then be tested against the preliminary motion model to compute an error for each remaining feature correspondence (e.g., a difference between the actual position of corresponding feature points/descriptors in the match image 320 and the mapped position as computed by the preliminary motion model). Feature correspondences that result in an error that satisfies one or more thresholds/conditions are considered preliminary inliers and are used to determine preliminary model parameters for the preliminary motion model. Feature correspondences that result in an error that fails to satisfy the threshold(s)/condition(s) are considered preliminary outliers and are not used to determine the preliminary model parameters for the preliminary motion model. After determining the preliminary model parameters for the preliminary motion model using the preliminary inliers, the preliminary motion model is tested against all of the feature correspondences 402 to determine how well the preliminary motion model fits the entire set. The feature correspondences that result in satisfactory error values may be added to the inlier set 410, with the remaining feature correspondences being assigned to the outlier set 412. If the inlier set 410 satisfies predetermined conditions (e.g., a sufficient percentage of feature correspondences 402 are included in the inlier set), the inlier set 410 may be used to determine parameters 416 of a motion model 414 that is output by the motion model computation 408. Otherwise, the motion model computation 408 may be iterated any number of times (e.g., using a new random sample feature correspondences to determine the preliminary motion model and parameters thereof) to attempt to converge at a suitable motion model 414.

The motion model 414 may take on various forms, such as a 3D rotation model, homography transformation model, affine or similarity transform, and/or any parametric or other type of model (e.g., that implements translation, rotation, scaling, and/or other components).

The motion model 414 determined via motion model computation 408 utilizing feature correspondences 402 may be utilized to map pixels from the reference image 330 to the match image 320 to generate output imagery. However, as noted above, the motion model 414 may be influenced by the object(s) in the captured scene that contribute more feature correspondences to the inlier set 410 used to determine the parameters 416 of the motion model 414. Over time, features of different objects at different depths may primarily contribute to the inlier set 410, which can cause rapid changes to the motion model 414 over time. Rapid changes to the motion model 414 over time can cause artifacts in output imagery (e.g., causing oscillation of depictions/representations/highlighting of the scene content captured by both the reference camera and the match camera or of the portion of the scene to which the reference camera is directed).

Accordingly, as noted above, disclosed embodiments may compute one or more additional motion models using the same feature correspondences and select a motion model for generating an output image (e.g., at a current frame/timepoint) in a manner that enforces temporal consistency (e.g., reducing rapid shifts and/or oscillations of depictions in output imagery).

Figure 4B:
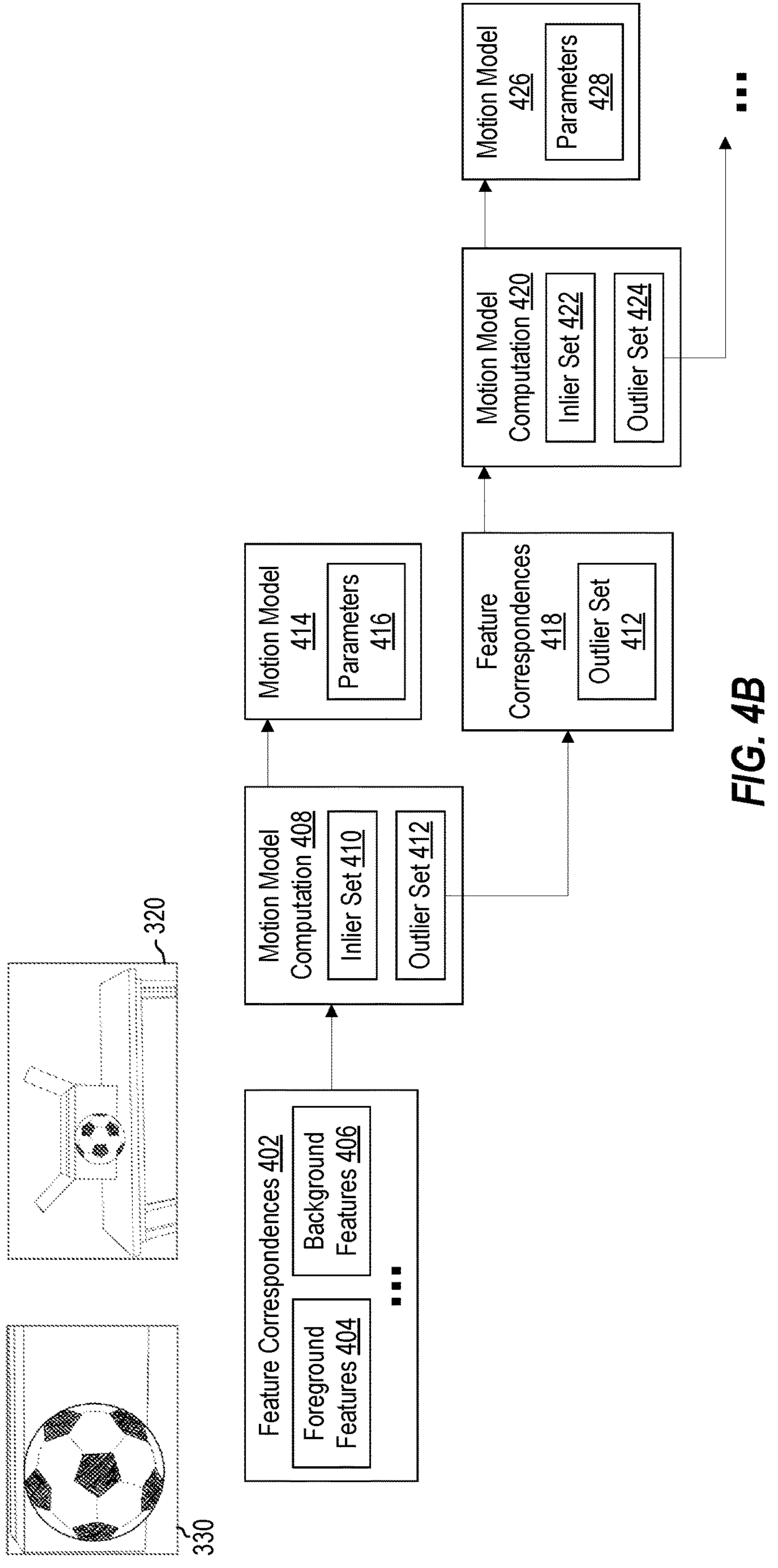
FIG. 4B illustrates a conceptual representation of generating a second motion model based upon a subset of feature correspondences from the imagery captured by the reference camera and the match camera.

FIG. 4B illustrates a conceptual representation of generating a second motion model based upon a subset of feature correspondences from the imagery captured by the reference camera and the match camera. In particular, FIG. 4B illustrates a modified set of feature correspondences 418, which is depicted as including the outlier set 412 (and omitting the inlier set 410) of feature correspondences determined via the motion model computation 408. In some implementations, a system utilizes the modified set of feature correspondences 418 (e.g., the outlier set 412) to perform motion model computation 420 to generate another motion model 426 with separate parameters 428. Motion model computation 420 may employ similar techniques to motion model computation 408, such as iteratively sampling from the feature correspondences 418 and fitting/testing a preliminary motion model to obtain (an outlier set 424 and) an inlier set 422 of feature correspondences to determine parameters 428 for a motion model 426. The ellipsis below the motion model 426 indicates that, in some instances, the outlier set 424 may be utilized to form yet another modified set of feature correspondences to determine yet another motion model. In this way, any number of motion models may be obtained utilizing the same input set of feature correspondences 402.

By implementing the foregoing techniques multiple motion models may be obtained that include parameters based on feature correspondences associated with objects in the scene that are positioned at different depths. For instance, in an example where the foreground features 404 primarily contribute to the inlier set 410, the outlier set 412 may primarily comprise background features 406. Thus, motion model 414 may be primarily influenced by the foreground features 404, and motion model 426 may be primarily influenced by the background features 406. By obtaining multiple motion models based on features of imagery captured at a single timepoint, multiple motion models may be available for a system to select from to generate output imagery for the single timepoint in a manner that enables enforcement of temporal consistency of motion models over time.

Figure 4C:
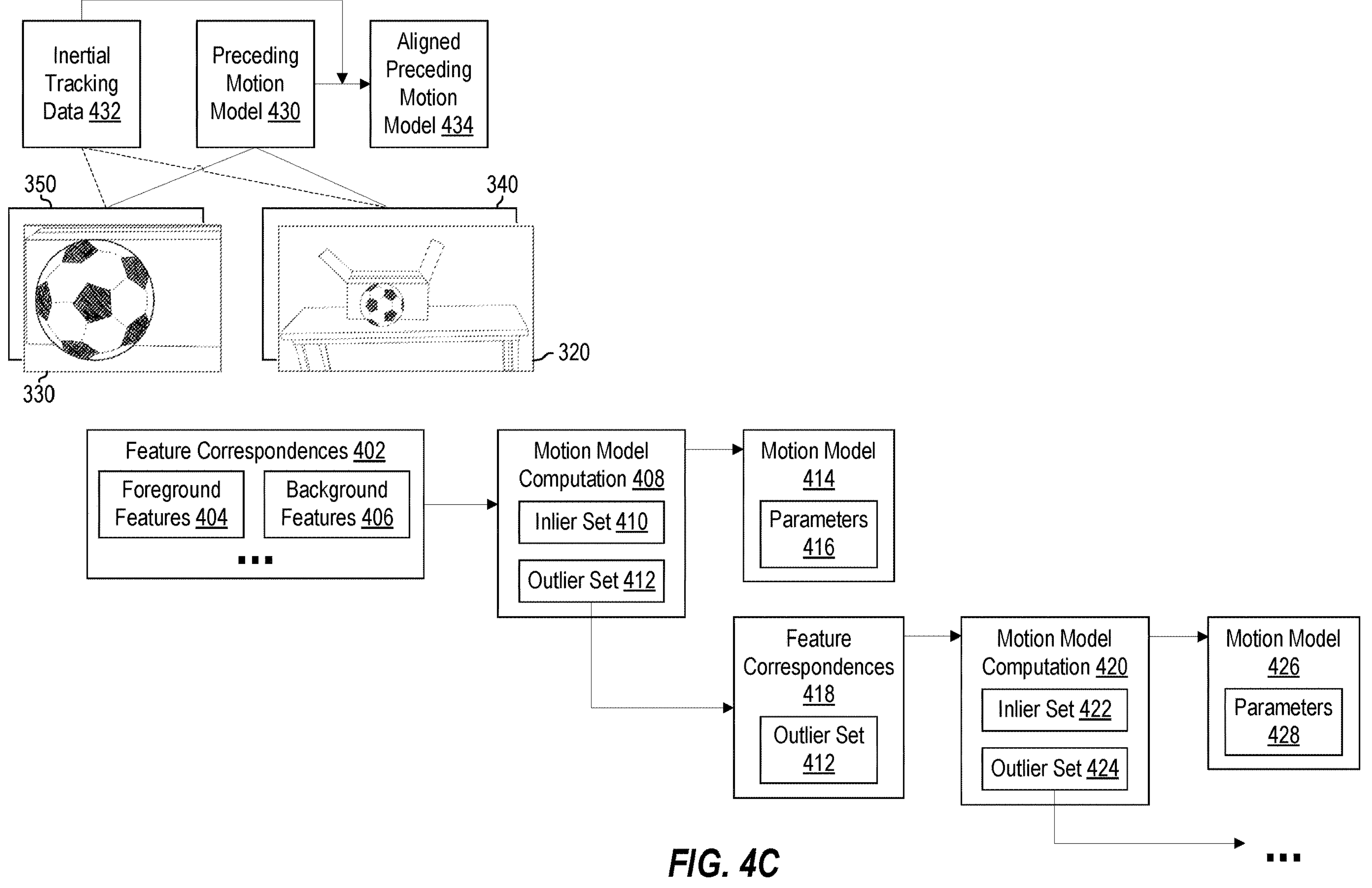
FIG. 4C illustrates a conceptual representation of generating an aligned preceding motion model based upon preceding imagery captured by the reference camera and the match camera and inertial tracking data.

For instance, FIG. 4C illustrates a conceptual representation of a preceding motion model 430 generated based upon preceding images 340 and 350 captured by the match camera and the reference camera, respectively. The preceding motion model 430 may be generated utilizing the techniques discussed above for generating motion models 414 and/or 426, such as by utilizing preceding feature correspondences determined from the preceding images 340 and 350 to perform motion model computation. In some instances, the positions of the match camera and the reference camera change between the capturing of the preceding images 340 and 350 and the capturing of images 320 and 330. Accordingly, inertial tracking data 432 (or other positional tracking data) of the match camera and the reference camera may be utilized to modify or update the preceding motion model 430 to account for the change in position represented in the inertial tracking data 432, resulting in an aligned preceding motion model 434. The inertial tracking data 432 may be acquired utilizing any suitable interoceptive sensor(s), such as accelerometers, gyroscopes, magnetometers, inertial measurement units (IMUs), and/or others.

Figure 4D:
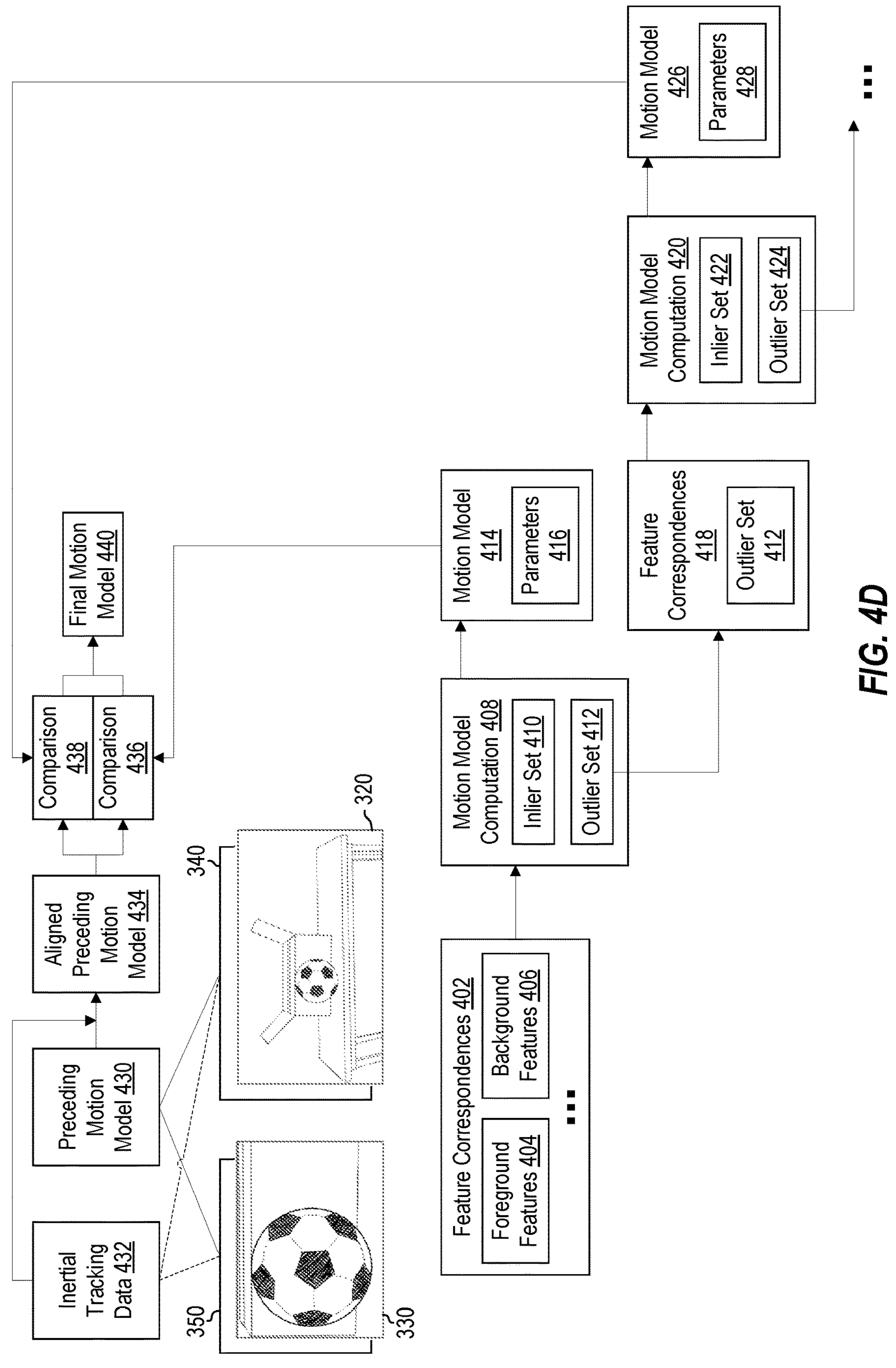
FIG. 4D illustrates a conceptual representation of identifying a final motion model based upon comparisons between the aligned preceding motion model and the first and second motion models.

The aligned preceding motion model 434 may be utilized to enforce temporal consistency between output imagery at the preceding timepoint (associated with preceding images 340 and 350) and the current timepoint (associated with images 320 and 330). For instance, FIG. 4D illustrates a conceptual representation of identifying a final motion model 440 based upon (i) a comparison 436 between motion model 414 and the aligned preceding motion model 434 and (ii) a comparison 438 between motion model 426 and the aligned preceding motion model 434.

The comparisons 436 and 438 may utilize any techniques or functions for assessing similarity between two models, such as, by way of non-limiting example, root mean square error, cosine similarity, Mahalanobis distance, and/or others. In one example, where the aligned preceding motion model 434 and motion models 414 and 426 comprise 3D rotation matrices, comparison 436 may comprise computing an angle between the look vectors of the aligned preceding motion model 434 and motion model 414, and comparison 438 may comprise computing an angle between the look vectors of the aligned preceding motion model 434 and motion model 426.

Figure 4E:
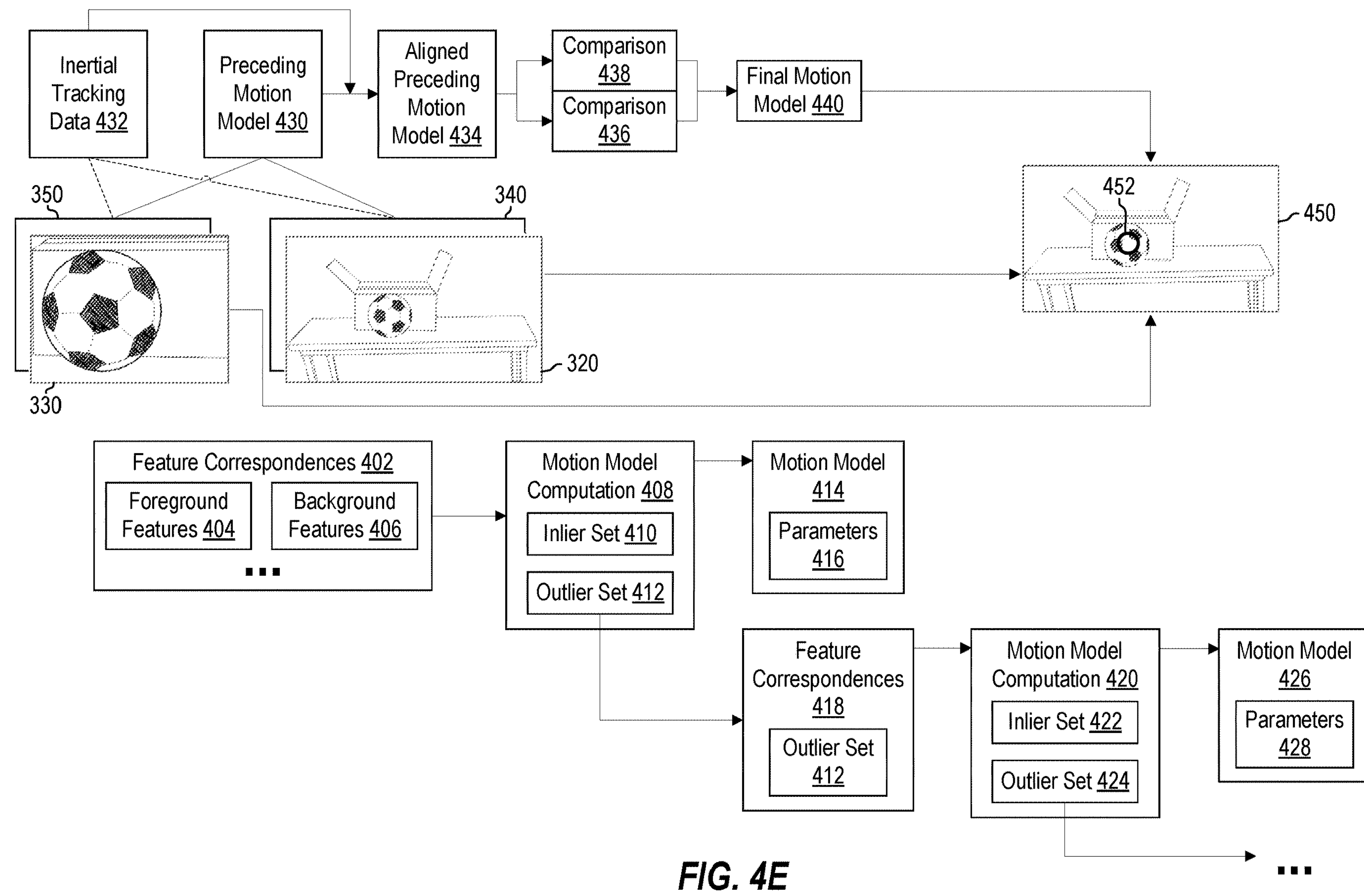
FIG. 4E illustrates a conceptual representation of generating an output image using the final motion model and the imagery captured by the reference camera and the match camera.

Based upon the comparisons 436 and 438, a system may select the final motion model 440 from among motion models 414 and 426 as the motion model that has the greatest similarity to the aligned preceding motion model 434. Such functionality may enforce temporal consistency in motion models associated with consecutive timepoints, which may reduce oscillation and/or other artifacts in output imagery. FIG. 4E illustrates a conceptual representation of generating an output image 450 using the final motion model 440 and the images 320 and 330 captured by the match camera and the reference camera, respectively. In the example of FIG. 4E, the output image 450 comprises a depiction 452 of one or more portions (e.g., a central portion) of the scene as captured by the reference camera (e.g., the camera of the user instrument 306) overlayed on the match image 320 captured by the match camera (e.g., the camera of the HMD 304). As noted above, an output image may take on other forms in accordance with implementations of the present disclosure, such the reference image 330 overlayed onto the match image 320 using the final motion model 440.

The final motion model selected by the system to generate output imagery using match image 320 and reference image 330 may be utilized as a preceding motion model (which may be aligned to a subsequent timepoint using IMU data) for selecting a subsequent final motion model (from among a subsequent set of motion models) to generate subsequent output imagery using a subsequent match image and subsequent reference image.

Selecting Motion Models for Aligning Scene Content Captured by Different Image Sensors In some implementations, it is advantageous to select a motion model from among available motion models to generate output imagery for a particular timepoint that is primarily influenced by and/or most accurate with respect to the scene content in a particular region of the reference image (e.g., a central region). For example, some user experiences enable users to interact with and/or provide input directed to object(s) in the scene that are in the center of the field of view of the reference camera (e.g., the camera of the user instrument 306).

A user might rely on output imagery (e.g., output image 450) depicting the portion of the scene captured by both the reference camera and the match camera (e.g., the camera of the HMD 304) to determine the object(s) in the scene that the reference camera is pointed toward. However, a motion model used to generate such output imagery might be heavily influenced by objects captured by the reference camera that are not in the center of the field of view of the reference camera. For instance, in reference image 330, the edges and corners of the box 310 may contribute more feature correspondences than the ball 308 to an inlier set used to determine model parameters of a motion model used to generate an output image. The output image may thus inaccurately represent that the center of the field of view of the reference camera is directed to a portion of the ball 308 in the scene (see FIG. 2 and attendant description).

Accordingly, at least some disclosed embodiments are directed to selecting a motion model for generating an output image in a manner that is focused on accurately representing the portion of a scene captured by a particular region (e.g., a center region) of the reference camera. For example, at least some disclosed embodiments include defining a reference patch from (the center of) the reference image and comparing the reference patch to match patches obtained in association with different motion models. The motion model associated with the match patch that is most similar to the reference patch may be selected to align the reference image and the match image to generate output imagery.

FIGS. 5A through 5E provide an illustrative example of such functionality that uses the reference image 330 and the match image 320 acquired via the reference camera (e.g., the image sensor of the user instrument 306) and the match camera (e.g., the image sensor of the HMD 304), respectively. The example of FIGS. 5A through 5E also utilizes the motion models 414 and 426 (e.g., acquired via motion model computation 408 and 420, respectively) and the aligned preceding motion model 434 (e.g., acquired based upon preceding reference and match images and aligned via inertial or other positional tracking data). One will appreciate that any match and reference images and any set of motion models (of any type and/or quantity) may be utilized in accordance with the disclosed principles. For instance, a motion model may be obtained from inertial tracking data and/or from external trackers.

Figure 5A:
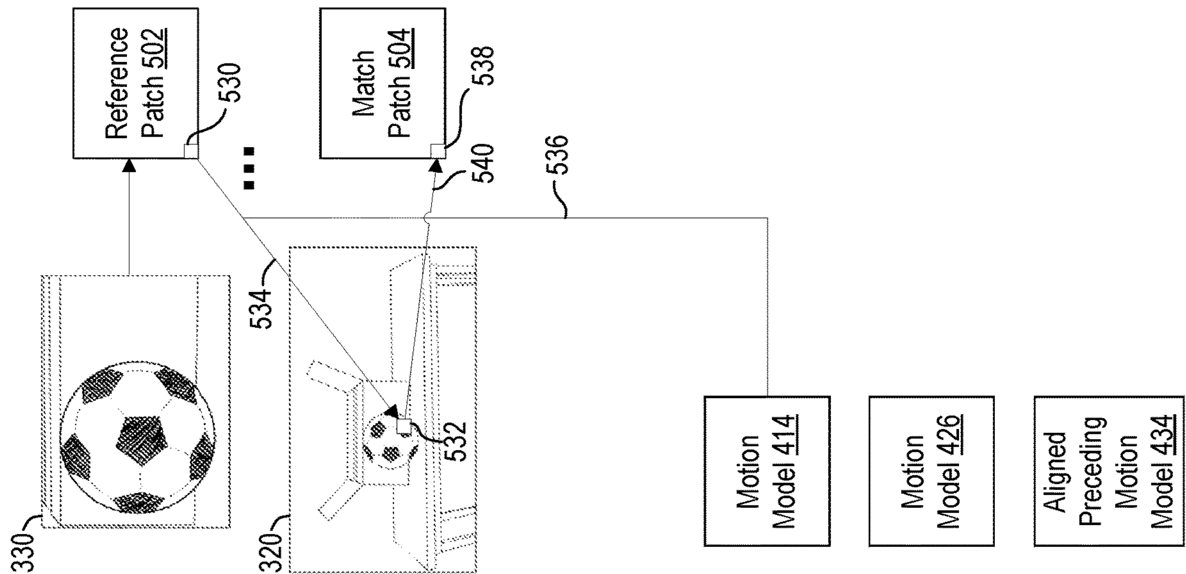
FIGS. 5A through 5C illustrate conceptual representations of obtaining a reference patch based upon an image of a reference camera and generating match patches using different motion models.

FIG. 5A conceptually depicts a reference patch 502 defined from image data of the reference image 330. In the example of FIG. 5A, the reference patch 502 includes a subset of contiguous pixels of the reference image 330. For instance, the reference patch 502 may comprise a pixel patch located at the center of the reference image 330 of any size (e.g., 32×32 pixels).

The motion models shown in FIG. 5A (motion models 414 and 426 and the aligned preceding motion model 434) may be regarded as candidate motion models that may potentially be used to align the image content of the reference image 330 and the match image 320 to generate output imagery. As noted above, a system may generate a match patch in association with each of the candidate motion models for comparison with the reference patch to determine which motion model to use to generate output imagery.

FIG. 5A illustrates a conceptual representation of using motion model 414 and the reference patch 502 to generate a match patch 504 for association with motion model 414. In particular, FIG. 5A conceptually depicts a pixel coordinate 530 of the reference patch 502 and depicts mapping of the pixel coordinate 530 to a corresponding pixel coordinate 532 of the match image 320 (indicated by line 534). FIG. 5A furthermore conceptually indicates that motion model 414 is utilized to map pixel coordinate 530 to corresponding pixel coordinate 532 (indicated by line 536).

In the example of FIG. 5A, with the corresponding pixel coordinate 532 for pixel coordinate 530 determined, a system uses the pixel value of the match image 320 at the corresponding pixel coordinate 532 to define pixel 538 of the match patch 504 (indicated by line 540). In the example of FIG. 5A, pixel 538 has the same pixel coordinate as pixel coordinate 530 of the reference patch 502. The ellipsis in FIG. 5A indicates that all pixel coordinates of the reference patch 502 may be mapped via the motion model 414 to corresponding pixel coordinates of the match image 320, and the corresponding pixel coordinates may be utilized to define pixel values of the match patch 504. One will appreciate that various transformations and/or operations may be applied to pixel values at corresponding pixel coordinates of the match image 320 to define pixel values for the match patch 504 (e.g., bilinear interpolation, and/or others).

Figure 5B:
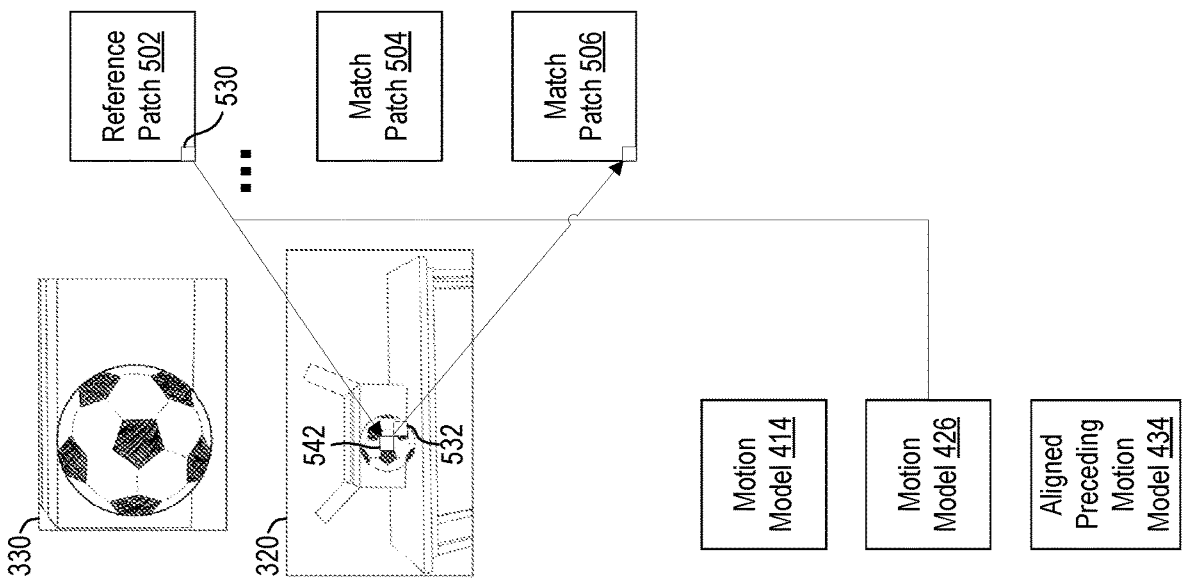
Figure 5C:
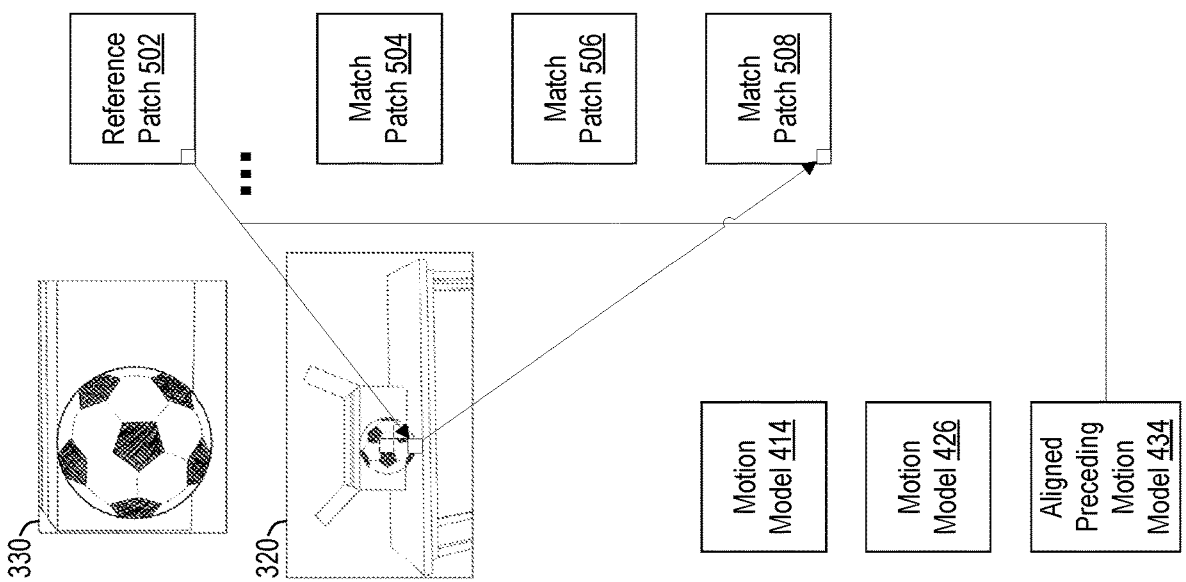

FIG. 5B illustrates that techniques similar to those discussed above with reference to FIG. 5A may be performed to utilize motion model 426 to map pixel coordinates of the reference patch 502 to corresponding pixel coordinates of the match image 320 to determine pixel values of the match image 320 to define pixel values of a match patch 506 for association with the motion model 426. FIG. 5B illustrates an example in which a corresponding pixel coordinate 542 determined by using motion model 426 to map pixel coordinate 530 onto the match image 320 is different than the corresponding pixel coordinate 532 of FIG. 5A. This may occur because of differences between motion model 414 and motion model 426 (e.g., resulting from different sets of feature correspondences being used to define model parameters for the different motion models 414 and 426). FIG. 5C similarly illustrates utilizing the aligned preceding motion model 434 to map pixel coordinates of the reference patch 502 to corresponding pixel coordinates of the match image 320 to determine pixel values of the match image for defining pixel values of a match patch 508 for association with the aligned preceding motion model 434.

Figure 5D:
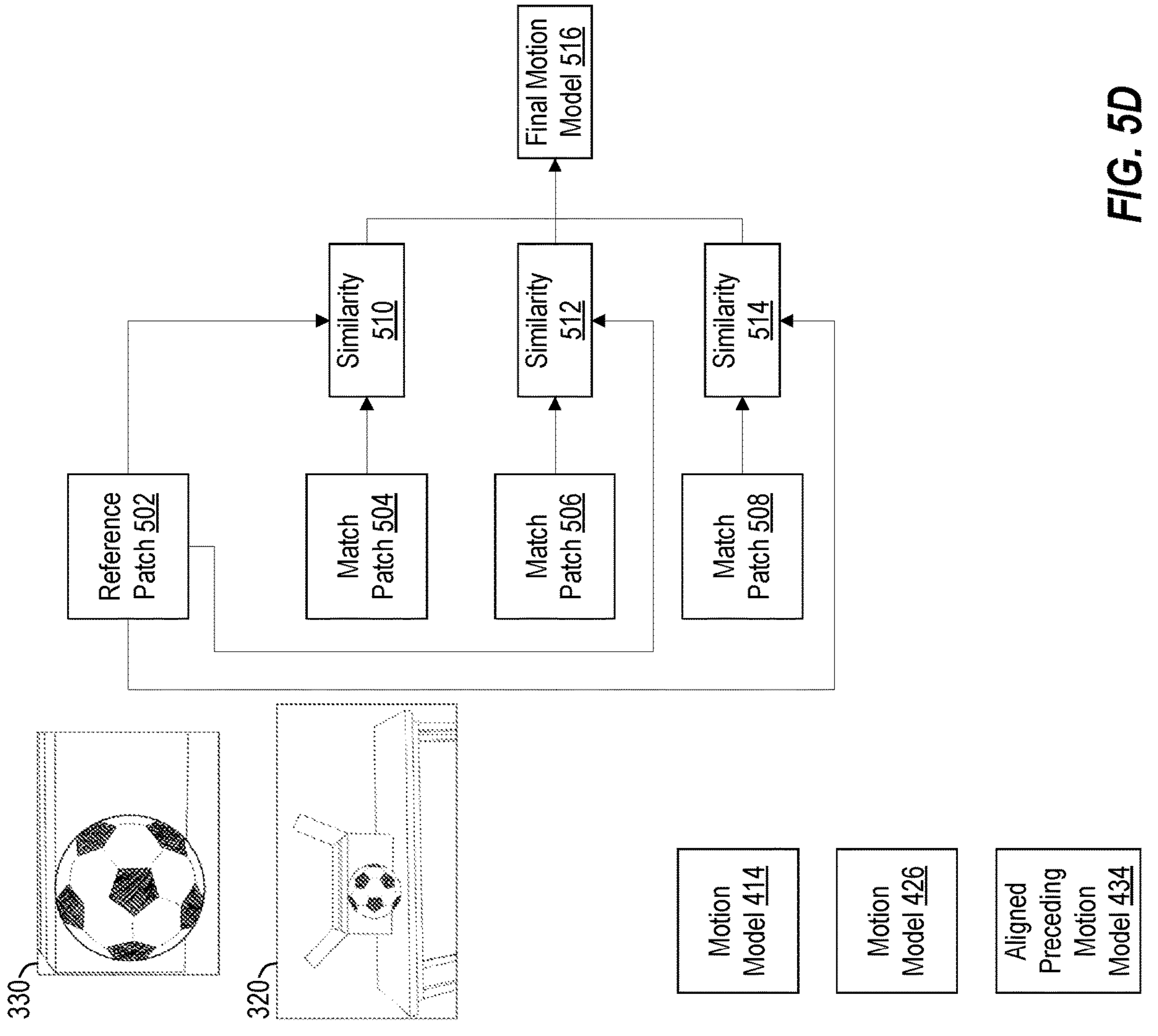
FIG. 5D illustrates a conceptual representation of selecting a final motion model from the different motion models based upon similarity measurements between the reference patch and the different match patches.

FIG. 5D depicts the different match patches obtained in association with the different motion models (i.e., match patch 504 associated with motion model 414, match patch 506 associated with model 426, and match patch 508 associated with the aligned preceding motion model 434). As noted above, the different match patches associated with the different motion models may be compared to the reference patch to determine which motion model to use to generate output imagery based upon the reference image 330 and the match image 320. FIG. 5D conceptually depicts determining similarity 510 between the reference patch 502 and the match patch 504, determining similarity 512 between the reference patch 502 and the match patch 506, and determining similarity 514 between the reference patch 502 and the match patch 508.

FIG. 5D also conceptually depicts selecting a final motion model 516 based on the measured similarities 510, 512, and 514 between the reference patch 502 and the various match patches 504, 506, and 508. For instance, the final motion model 516 may comprise the motion model (e.g., selected from among motion model 414, motion model 426, and motion model 434) that is associated with a match patch that has the greatest similarity to the reference patch 502.

Various techniques may be utilized to determine similarity 510, 512, and 514, such as, by way of non-limiting example, cross-correlation (e.g., normalized cross-correlation (NCC)), intensity differences (e.g., absolute intensity differences, squared differences, sum of squared differences), mutual information, edge response differences, Euclidean distance, histogram comparison, cosine similarity, machine learning based approaches, and/or others. In some instances, similarities 510, 512, and/or 514 comprise weighted similarities the reference patch 502 and the various match patches 504, 506, and 508 (e.g., with additional weight being given to particular regions of the compared patches, such as the central regions).

In one example, the determinations of similarity 510, 512, and 514 are obtained via normalized cross-correlation. For instance, a system may generate an offset-normalized reference patch by modifying pixel values of the reference patch 502 using a set of mean pixel values determined based upon the original pixel values of the reference patch 502. For instance, the system may subtract the set of mean pixel values from the original pixel values of the reference patch 502. The set of mean pixel values may comprise a set of weighted mean pixel values (e.g., with greater weight given toward pixels in a particular region of the reference patch 502, such as the central region). For example, the set of weighted mean pixel values may be obtained by applying a Gaussian weight mask to the reference patch 502 (with greatest weight being assigned to central pixels).

A system may then utilize the pixel values of the offset-normalized reference patch to determine a reference patch vector (e.g., which may be divided by its vector length to obtain a unit vector). For example, a 32×32 pixel offset-normalized reference patch may be converted into a 1024-dimensional vector. In some instances, each element of the reference patch vector is multiplied by its corresponding weight from the set of weighted mean pixel values (determined from the original pixel values of the reference patch 502).

A similar process may be followed to determine a match patch vector for each of the match patches 504, 506, and 508. For instance, to obtain a match patch vector for match patch 504, a system may generate an offset-normalized match patch by modifying pixel values of the match patch 504 using a set of (weighted) mean pixel values determined based upon the original pixel values of the match patch 504. For instance, the system may subtract the set of (weighted) mean pixel values from the original pixel values of the match patch 504. A system may then utilize the pixel values of the offset-normalized match patch to determine the match patch vector (e.g., which may be divided by its vector length to obtain a unit vector). In some instances, each element of the match patch vector is multiplied by its corresponding weight from the set of weighted mean pixel values (determined from the original pixel values of the match patch 504).

Match patch vectors may similarly be computed for the other match patches 506 and 508. The reference patch vector of the reference patch 502 may be compared to the match patch vectors for the different match patches 504, 506, and 508 to obtain the similarities 510, 512, and 514. For instance, the reference patch vector may be compared to each match patch vector by computing a dot product between the vectors to obtain a similarity score (e.g., between −1 and 1) for each match patch vector (indicating the similarity between its corresponding match patch and the reference patch 502). The final motion model 516 may be selected on the basis of such similarity scores (e.g., by selecting the motion model associated with the match patch with a match patch vector that has a highest similarity score when compared to the reference patch vector of the reference patch 502).

In some instances, none of the motion models (e.g., motion models 414, 426, and 434) provide a match patch that is highly similar to the reference patch 502 (e.g., match patch vectors for each match patch result in low similarity scores when compared to the reference patch 502). In such instances, it may be advantageous for a system to refrain from automatically selecting the motion model that provides a match patch that is most similar to the reference patch 502. Instead, it may be advantageous for the system to enforce temporal consistency by selecting the motion model that is most similar to a preceding motion model (or an aligned preceding motion model).

Figure 5E:
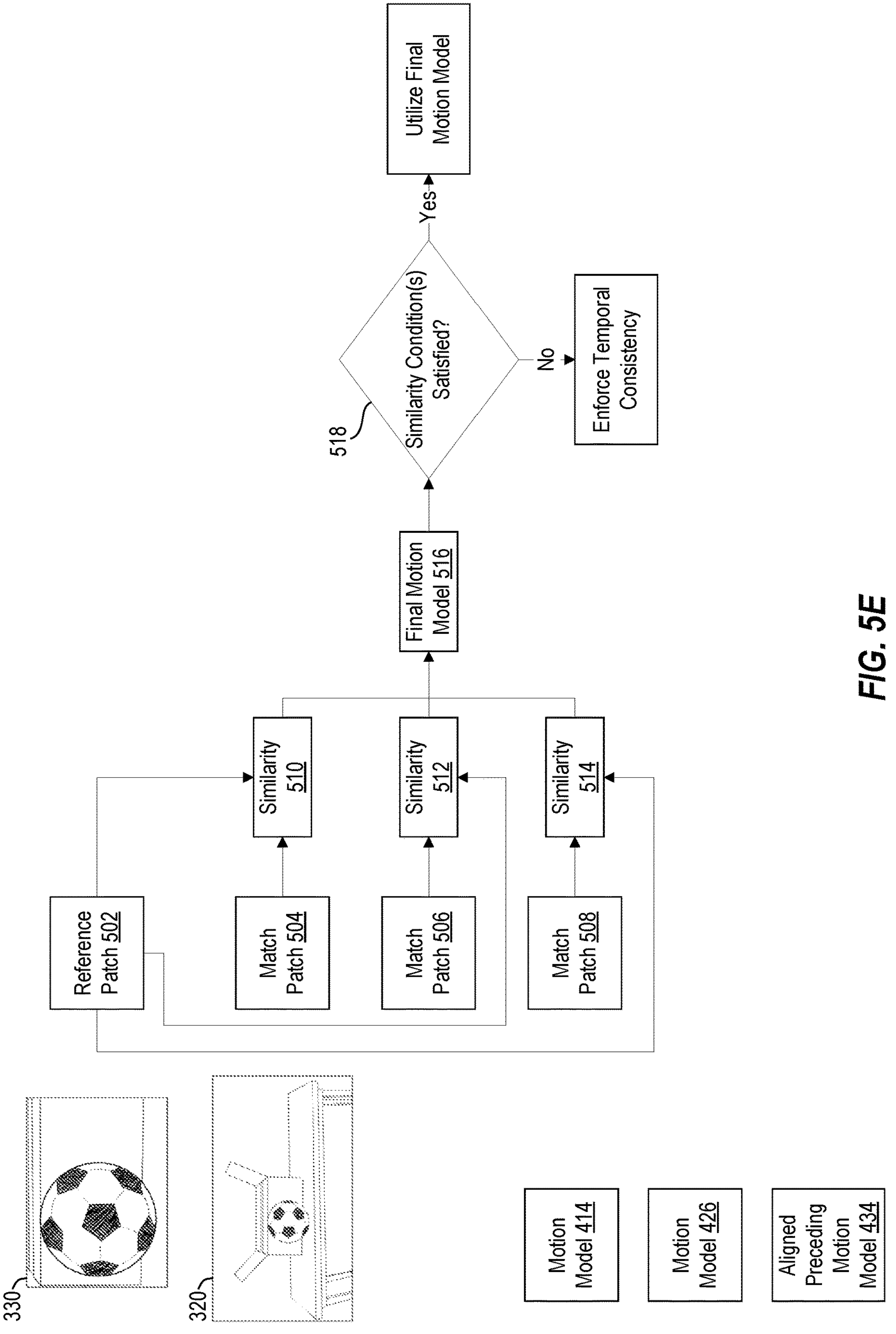
FIG. 5E illustrates a conceptual representation of determining whether to enforce temporal consistency or utilize the final motion model.

Accordingly, FIG. 5E illustrates a conceptual representation of determining whether to enforce temporal consistency or utilize the final motion model 516 to generate output imagery using the reference image 330 and the match image 320. In particular, FIG. 5E illustrates that a system may determine (at decision block 518) whether one or more similarity conditions are satisfied by the similarity (e.g., similarity 510, 512, and/or 514) between the match patch associated with the final motion model 516 (and/or the other motion models) and the reference patch 502. The similarity condition(s) may comprise, for example, one or more threshold similarity scores (e.g., a score of 0.7, or another value).

In response to determining that the similarity associated with the final motion model 516 (and/or the other motion models) satisfies the similarity condition(s) (indicated by the "Yes" extending from decision block 518), a system may proceed to utilize the final motion model 516 to align the reference image 330 with the match image 320 to generate output imagery. In contrast, in response to determining that the similarity associated with the final motion model 516 (and/or the other motion models) fails to satisfy the similarity condition(s) (indicated by the "No" extending from decision block 518), the system may instead enforce temporal consistency by selecting a final motion model from among motion models 414 and 426 based on similarity between the aligned preceding motion model 434 and motion models 414 and 426 (see FIG. 4D and attendant description).

The final motion model selected by the system to generate output imagery using match image 320 and reference image 330 may be utilized as a preceding motion model (which may be aligned to a subsequent timepoint using IMU data) for selecting a subsequent final motion model (from among a subsequent set of motion models) to generate subsequent output imagery using a subsequent match image and subsequent reference image.

Example Method(s)

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 6:
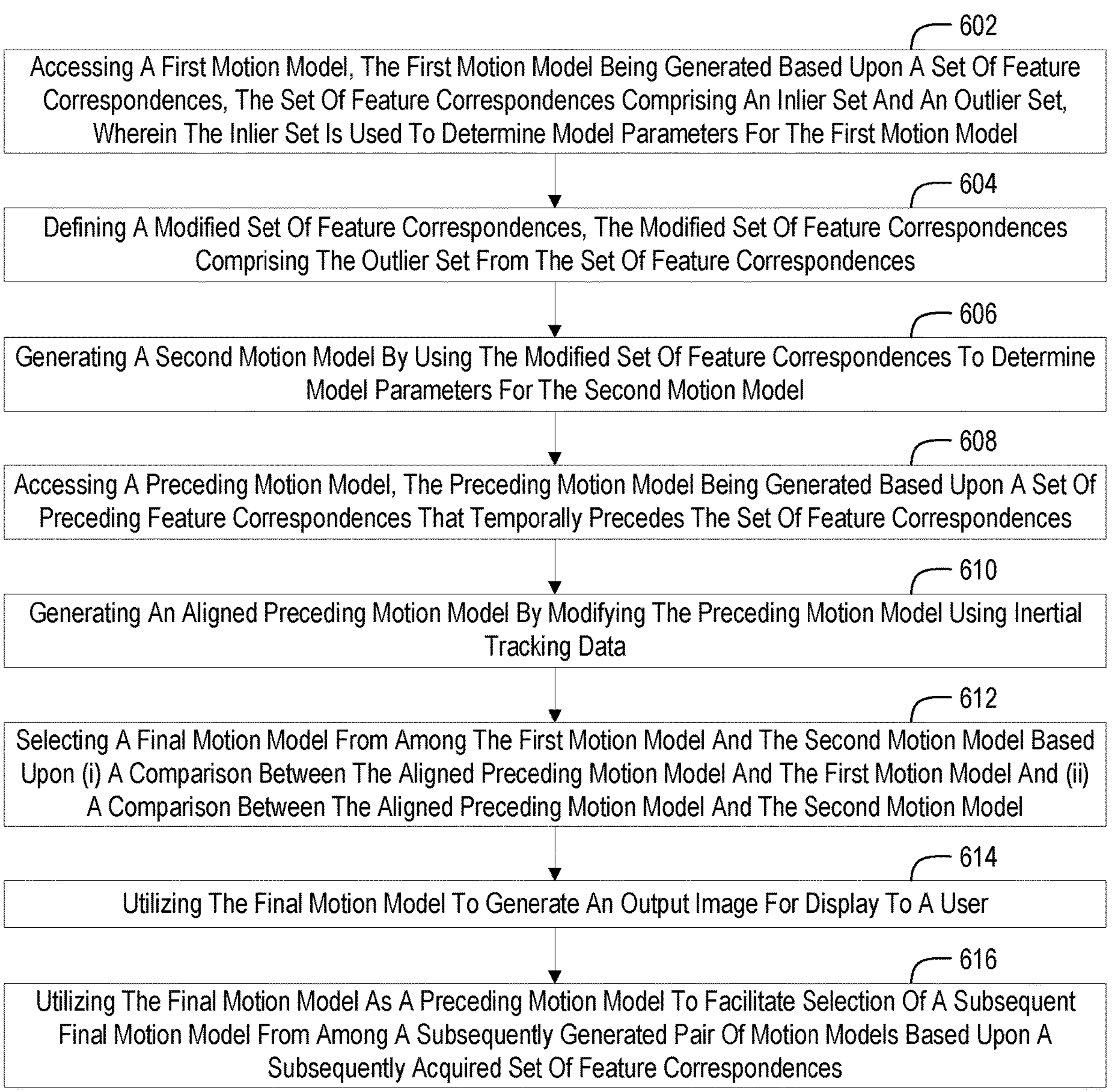
FIGS. 6, 7, and 8 illustrate example flow diagrams depicting acts associated with determining motion models for aligning scene content captured by different image sensors.
Figure 7:
Figure 8:
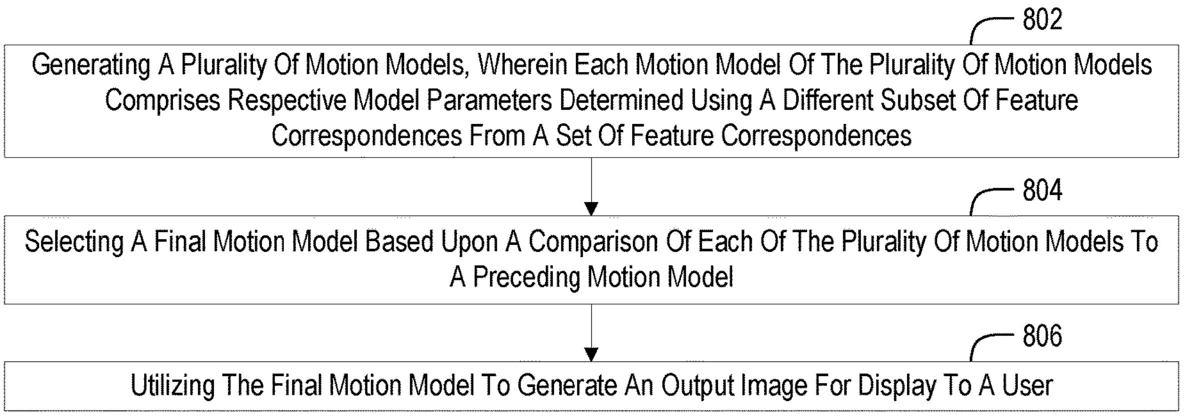

FIGS. 6, 7, and 8 illustrate example flow diagrams 600, 700, and 800, respectively, depicting acts associated with determining motion models for aligning scene content captured by different image sensors. The acts of flow diagrams 600, 700, and 800 may be performed utilizing one or more components of one or more systems (e.g., system 100).

Act 602 of flow diagram 600 of FIG. 6 includes accessing a first motion model, the first motion model being generated based upon a set of feature correspondences, the set of feature correspondences comprising an inlier set and an outlier set, wherein the inlier set is used to determine model parameters for the first motion model. In some instances, the set of feature correspondences is determined by performing descriptor matching on features extracted from (i) a first image captured by a first image sensor and (ii) a second image captured by a second image sensor. In some implementations, the inlier set comprises feature correspondences associated with a first object positioned at a first depth within a scene represented in the first image and the second image. In some examples, the outlier set comprises feature correspondences associated with a second object positioned at a second depth within the scene represented in the first image and the second image.

Act 604 of flow diagram 600 includes defining a modified set of feature correspondences, the modified set of feature correspondences comprising the outlier set from the set of feature correspondences.

Act 606 of flow diagram 600 includes generating a second motion model by using the modified set of feature correspondences to determine model parameters for the second motion model. In some instances, the first motion model and the second motion model comprise 3D rotation models. In some implementations, the first motion model or the second motion model is generated utilizing random sample consensus (RANSAC).

Act 608 of flow diagram 600 includes accessing a preceding motion model, the preceding motion model being generated based upon a set of preceding feature correspondences that temporally precedes the set of feature correspondences.

Act 610 of flow diagram 600 includes generating an aligned preceding motion model by modifying the preceding motion model using inertial tracking data.

Act 612 of flow diagram 600 includes selecting a final motion model from among the first motion model and the second motion model based upon (i) a comparison between the aligned preceding motion model and the first motion model and (ii) a comparison between the aligned preceding motion model and the second motion model. In some examples, the comparison between the aligned preceding motion model and the first motion model comprises a comparison between look vectors of the aligned preceding motion model and the first motion model. In some instances, the comparison between the aligned preceding motion model and the second motion model comprises a comparison between look vectors of the aligned preceding motion model and the second motion model.

Act 614 of flow diagram 600 includes utilizing the final motion model to generate an output image for display to a user. In some examples, the output image comprises an overlay of the first image and the second image.

Act 616 of flow diagram 600 includes utilizing the final motion model as a preceding motion model to facilitate selection of a subsequent final motion model from among a subsequently generated pair of motion models based upon a subsequently acquired set of feature correspondences.

Act 702 of flow diagram 700 of FIG. 7 includes obtaining a first image using a first image sensor. In some instances, the first image sensor is mounted on a head-mounted display (HMD).

Act 704 of flow diagram 700 includes determining a first set of features by performing feature extraction on the first image.

Act 706 of flow diagram 700 includes obtaining a second image using a second image sensor. In some implementations, the second image sensor is mounted in a user instrument for use in conjunction with the HMD.

Act 708 of flow diagram 700 includes determining a second set of features by performing feature extraction on the second image.

Act 710 of flow diagram 700 includes determining a set of feature correspondences by performing descriptor matching on the first set of features and the second set of features.

Act 712 of flow diagram 700 includes generating a first motion model by determining an inlier set from the set of feature correspondences and using the inlier set to determine model parameters for the first motion model. In some examples, the inlier set comprises feature correspondences associated with a first object positioned at a first depth within a scene represented in the first image and the second image.

Act 714 of flow diagram 700 includes generating a second motion model by determining an outlier set from the set of feature correspondences and using the outlier set to determine model parameters for the second motion model. In some instances, the outlier set comprises feature correspondences associated with a second object positioned at a second depth within the scene represented in the first image and the second image.

Act 716 of flow diagram 700 includes obtaining a preceding motion model, the preceding motion model being generated based upon a set of preceding feature correspondences that temporally precedes the set of feature correspondences.

Act 718 of flow diagram 700 includes generating an aligned preceding motion model by modifying the preceding motion model using inertial tracking data.

Act 720 of flow diagram 700 includes selecting a final motion model from among the first motion model and the second motion model based upon (i) a comparison between the aligned preceding motion model and the first motion model and (ii) a comparison between the aligned preceding motion model and the second motion model.

Act 722 of flow diagram 700 includes utilizing the final motion model to generate an output image for display to a user. In some implementations, the output image comprises an overlay of the first image and the second image.

800

Act 802 of flow diagram 800 of FIG. 8 includes generating a plurality of motion models, wherein each motion model of the plurality of motion models comprises respective model parameters determined using a different subset of feature correspondences from a set of feature correspondences.

Act 804 of flow diagram 800 includes selecting a final motion model based upon a comparison of each of the plurality of motion models to a preceding motion model. In some examples, the preceding motion model is temporally updated using inertial tracking data.

Act 806 of flow diagram 800 includes utilizing the final motion model to generate an output image for display to a user.

Figure 9:
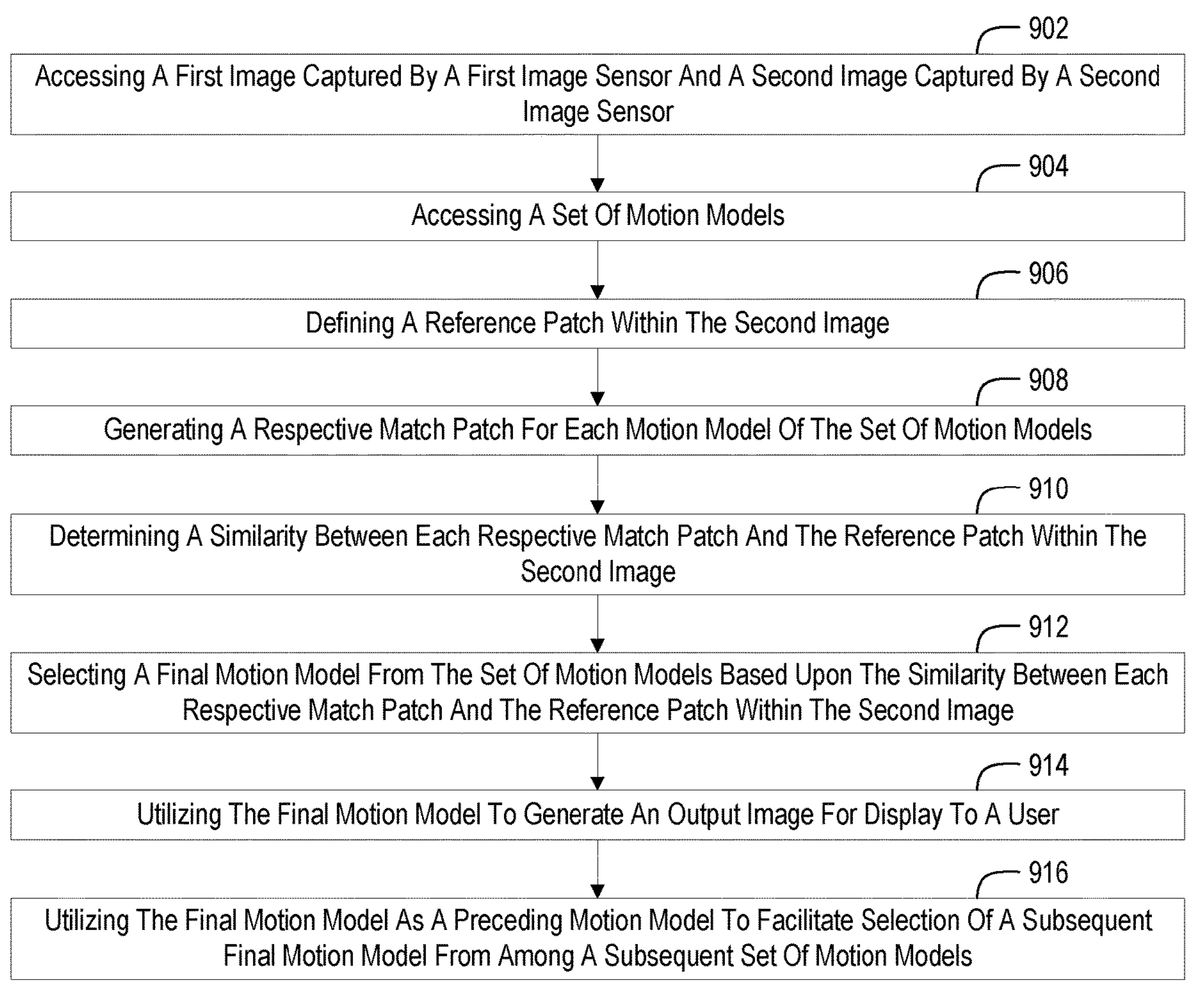
FIG. 9 illustrates an example flow diagram depicting acts associated with selecting motion models for aligning scene content captured by different image sensors.

FIG. 9 illustrates an example flow diagram 900 depicting acts associated with selecting motion models for aligning scene content captured by different image sensors. The acts of flow diagram 900 may be performed utilizing one or more components of one or more systems (e.g., system 100).

900

Act 902 of flow diagram 900 includes accessing a first image captured by a first image sensor and a second image captured by a second image sensor.

Act 904 of flow diagram 900 includes accessing a set of motion models. In some instances, one or more motion models of the set of motion models are determined using features extracted from the first image or the second image. In some implementations, at least one motion model of the set of motion models comprises a preceding motion model determined using (i) features extracted from one or more preceding images that temporally precede the first image and the second image (ii) inertial tracking data.

Act 906 of flow diagram 900 includes defining a reference patch within the second image.

Act 908 of flow diagram 900 includes generating a respective match patch for each motion model of the set of motion models. In some examples, generating the respective match patch for each motion model of the set of motion models comprises, for each particular motion model of the set of motion models: (i) for each pixel coordinate of the reference patch within the second image, determining a corresponding pixel coordinate within the first image using the particular motion model; and (ii) defining each pixel value at each pixel coordinate of the respective match patch for the particular motion model using pixel values from each of the corresponding pixel coordinates within the first image.

Act 910 of flow diagram 900 includes determining a similarity between each respective match patch and the reference patch within the second image. In some instances, determining the similarity between each respective match patch and the reference patch comprises determining a weighted similarity between each respective match patch and the reference patch.

In some implementations, determining the similarity between each respective match patch and the reference patch within the second image utilizes normalized cross-correlation. In some examples, determining the similarity between each respective match patch and the reference patch within the second image comprises: (i) generating an offset-normalized reference patch by modifying pixel values of the reference patch using a set of mean pixel values determined based upon original pixel values of the reference patch; (ii) determining a reference patch vector based upon pixel values of the offset-normalized reference patch; (iii) for each particular respective match patch: (a) generating an offset-normalized particular respective match patch by modifying pixel values of the particular respective match patch with a set of mean pixel values determined based upon original pixel values of the particular respective match patch, and (b) determining a particular respective match patch vector based upon pixel values of the offset-normalized particular respective match patch; and (iv) comparing the reference patch vector to each particular respective match patch vector. In some implementations, modifying pixel values of the reference patch using the set of mean pixel values determined based upon original pixel values of the reference patch comprises subtracting the set of mean pixel values determined based upon the original pixel values of the reference patch from the original pixel values of the reference patch. In some examples, the set of mean pixel values determined based upon the original pixel values of the reference patch comprises a set of weighted mean pixel values determined based upon the original pixel values of the reference patch. In some instances, the set of weighted mean pixel values determined based upon the original pixel values of the reference patch is determined using a Gaussian weight mask. In some implementations, determining the reference patch vector based upon pixel values of the offset-normalized reference patch comprises multiplying each element of the reference patch vector by its corresponding weight from the set of weighted mean pixel values determined based upon the original pixel values of the reference patch. In some examples, the reference patch vector comprises a reference patch unit vector. In some instances, modifying pixel values of the particular respective match patch using the set of mean pixel values determined based upon original pixel values of the particular respective match patch comprises subtracting the set of mean pixel values determined based upon the original pixel values of the particular respective match patch from the original pixel values of the particular respective match patch. In some implementations, the set of mean pixel values determined based upon original pixel values of the particular respective match patch comprises a set of weighted mean pixel values determined based upon the original pixel values of the particular respective match patch. In some examples, the set of weighted mean pixel values determined based upon the original pixel values of the particular respective match patch is determined using a Gaussian weight mask. In some instances, determining the particular respective match patch vector based upon pixel values of the offset-normalized particular respective match patch comprises multiplying each element of the particular respective match patch vector by its corresponding weight from the set of weighted mean pixel values determined based upon the original pixel values of the particular respective match patch. In some implementations, the particular respective match patch vector comprises a particular respective match patch unit vector. In some examples, comparing the reference patch vector to each particular respective match patch vector comprises determining a similarity score for each particular respective match patch vector by computing a dot product between the reference patch vector and each particular respective match patch vector.

Act 912 of flow diagram 900 includes selecting a final motion model from the set of motion models based upon the similarity between each respective match patch and the reference patch within the second image. In some instances, the final motion model from the set of motion models is selected based upon the similarity or the weighted similarity between each respective match patch and the reference patch. In some examples, the final motion model comprises a motion model of the set of motion models that is associated with the respective match patch that has a greatest similarity to the reference patch. In some implementations, the final motion model comprises a motion model of the set of motion models that is associated with the particular respective match patch vector with a highest similarity score. In some examples, selecting the final motion model comprises: (i) comparing the similarity score for each particular respective match patch vector to a threshold similarity; (ii) in response to determining that no similarity score of the particular respective match patch vectors satisfies the threshold similarity, defining the final motion model based upon a similarity between the at least one motion model and the one or more motion models; and (iii) in response to determining that one or more similarity scores of the particular respective match patch vectors satisfy the threshold similarity, defining the final motion model as a motion model of the set of motion models that is associated with the particular respective match patch vector with a highest similarity score.

Act 914 of flow diagram 900 includes utilizing the final motion model to generate an output image for display to a user.

Act 916 of flow diagram 900 includes utilizing the final motion model as a preceding motion model to facilitate selection of a subsequent final motion model from among a subsequent set of motion models.

Additional Details Related to the Disclosed Embodiments

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

As used herein, the term "about", when used to modify a numerical value or range, refers to any value within 5%, 10%, 15%, 20%, or 25% of the numerical value modified by the term "about".

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

We claim:

1. A system for selecting motion models for aligning scene content captured by different image sensors, the system comprising:
- one or more processors; and
- one or more hardware storage devices that store instructions that are executable by the one or more processors to configure the system to:
  - access a first image captured by a first image sensor and a second image captured by a second image sensor;
  - access a set of motion models, wherein the set of motion models comprises a preceding motion model generated based on features extracted from a preceding image pair captured by the first image sensor and the second image sensor and that temporally precedes the first image and the second image;
  - define a reference patch within the second image;
  - generate a respective match patch for each motion model of the set of motion models;
  - determine a similarity between each respective match patch and the reference patch within the second image;
  - select a final motion model from the set of motion models based upon the similarity between each respective match patch and the reference patch within the second image; and
  - utilize the final motion model to generate an output image for display to a user.

2. The system of claim 1, wherein generating the respective match patch for each motion model of the set of motion models comprises, for each particular motion model of the set of motion models:
- for each pixel coordinate of the reference patch within the second image, determining a corresponding pixel coordinate within the first image using the particular motion model; and
- defining each pixel value at each pixel coordinate of the respective match patch for the particular motion model using pixel values from each of the corresponding pixel coordinates within the first image.

3. The system of claim 1, wherein the final motion model comprises a motion model of the set of motion models that is associated with the respective match patch that has a greatest similarity to the reference patch.

4. The system of claim 1, wherein determining the similarity between each respective match patch and the reference patch comprises determining a weighted similarity between each respective match patch and the reference patch, and wherein the final motion model from the set of motion models is selected based upon the weighted similarity between each respective match patch and the reference patch.

5. The system of claim 1, wherein determining the similarity between each respective match patch and the reference patch within the second image utilizes normalized cross-correlation.

6. The system of claim 5, wherein determining the similarity between each respective match patch and the reference patch within the second image comprises:
- generating an offset-normalized reference patch by modifying pixel values of the reference patch using a set of mean pixel values determined based upon original pixel values of the reference patch;
- determining a reference patch vector based upon pixel values of the offset-normalized reference patch;
- for each particular respective match patch:
  - generating an offset-normalized particular respective match patch by modifying pixel values of the particular respective match patch with a set of mean pixel values determined based upon original pixel values of the particular respective match patch; and
  - determining a particular respective match patch vector based upon pixel values of the offset-normalized particular respective match patch; and
- comparing the reference patch vector to each particular respective match patch vector.

7. The system of claim 6, wherein modifying pixel values of the reference patch using the set of mean pixel values determined based upon original pixel values of the reference patch comprises subtracting the set of mean pixel values determined based upon the original pixel values of the reference patch from the original pixel values of the reference patch, or wherein modifying pixel values of the particular respective match patch using the set of mean pixel values determined based upon original pixel values of the particular respective match patch comprises subtracting the set of mean pixel values determined based upon the original pixel values of the particular respective match patch from the original pixel values of the particular respective match patch.

8. A method for selecting motion models for aligning scene content captured by different image sensors, the method comprising:

accessing a first image captured by a first image sensor and a second image captured by a second image sensor;

accessing a set of motion models, wherein the set of motion models comprises a preceding motion model generated based on features extracted from a preceding image pair captured by the first image sensor and the second image sensor and that temporally precedes the first image and the second image;

defining a reference patch within the second image;

generating a respective match patch for each motion model of the set of motion models;

determining a similarity between each respective match patch and the reference patch within the second image;

selecting a final motion model from the set of motion models based upon the similarity between each respective match patch and the reference patch within the second image; and utilizing the final motion model to generate an output image for display to a user.

9. The method of claim 8, wherein generating the respective match patch for each motion model of the set of motion models comprises, for each particular motion model of the set of motion models:

for each pixel coordinate of the reference patch within the second image, determining a corresponding pixel coordinate within the first image using the particular motion model; and defining each pixel value at each pixel coordinate of the respective match patch for the particular motion model using pixel values from each of the corresponding pixel coordinates within the first image.

10. The method of claim 8, wherein the final motion model comprises a motion model of the set of motion models that is associated with the respective match patch that has a greatest similarity to the reference patch.

11. The method of claim 8, wherein determining the similarity between each respective match patch and the reference patch comprises determining a weighted similarity between each respective match patch and the reference patch, and wherein the final motion model from the set of motion models is selected based upon the weighted similarity between each respective match patch and the reference patch.

12. The method of claim 8, wherein determining the similarity between each respective match patch and the reference patch within the second image utilizes normalized cross-correlation.

13. The method of claim 12, wherein determining the similarity between each respective match patch and the reference patch within the second image comprises:

generating an offset-normalized reference patch by modifying pixel values of the reference patch using a set of mean pixel values determined based upon original pixel values of the reference patch;

determining a reference patch vector based upon pixel values of the offset-normalized reference patch;

for each particular respective match patch:

generating an offset-normalized particular respective match patch by modifying pixel values of the particular respective match patch with a set of mean pixel values determined based upon original pixel values of the particular respective match patch; and determining a particular respective match patch vector based upon pixel values of the offset-normalized particular respective match patch; and comparing the reference patch vector to each particular respective match patch vector.

14. The method of claim 13, wherein modifying pixel values of the reference patch using the set of mean pixel values determined based upon original pixel values of the reference patch comprises subtracting the set of mean pixel values determined based upon the original pixel values of the reference patch from the original pixel values of the reference patch, or wherein modifying pixel values of the particular respective match patch using the set of mean pixel values determined based upon original pixel values of the particular respective match patch comprises subtracting the set of mean pixel values determined based upon the original pixel values of the particular respective match patch from the original pixel values of the particular respective match patch.

15. One or more hardware storage devices that store instructions that are executable by one or more processors of a system to configure the system to:

access a first image captured by a first image sensor and a second image captured by a second image sensor;

access a set of motion models, wherein the set of motion models comprises a preceding motion model generated based on features extracted from a preceding image pair captured by the first image sensor and the second image sensor and that temporally precedes the first image and the second image;

define a reference patch within the second image;

generate a respective match patch for each motion model of the set of motion models;

determine a similarity between each respective match patch and the reference patch within the second image;

select a final motion model from the set of motion models based upon the similarity between each respective match patch and the reference patch within the second image; and utilize the final motion model to generate an output image for display to a user.

16. The one or more hardware storage devices of claim 15, wherein generating the respective match patch for each motion model of the set of motion models comprises, for each particular motion model of the set of motion models:

for each pixel coordinate of the reference patch within the second image, determining a corresponding pixel coordinate within the first image using the particular motion model; and defining each pixel value at each pixel coordinate of the respective match patch for the particular motion model using pixel values from each of the corresponding pixel coordinates within the first image.

17. The one or more hardware storage devices of claim 15, wherein the final motion model comprises a motion model of the set of motion models that is associated with the respective match patch that has a greatest similarity to the reference patch.

18. The one or more hardware storage devices of claim 15, wherein determining the similarity between each respective match patch and the reference patch comprises determining a weighted similarity between each respective match patch and the reference patch, and wherein the final motion model from the set of motion models is selected based upon the weighted similarity between each respective match patch and the reference patch.

19. The one or more hardware storage devices of claim 15, wherein determining the similarity between each respective match patch and the reference patch within the second image utilizes normalized cross-correlation.

20. The one or more hardware storage devices of claim 19, wherein determining the similarity between each respective match patch and the reference patch within the second image comprises:

generating an offset-normalized reference patch by modifying pixel values of the reference patch using a set of mean pixel values determined based upon original pixel values of the reference patch;

determining a reference patch vector based upon pixel values of the offset-normalized reference patch;

for each particular respective match patch:

generating an offset-normalized particular respective match patch by modifying pixel values of the particular respective match patch with a set of mean pixel values determined based upon original pixel values of the particular respective match patch; and determining a particular respective match patch vector based upon pixel values of the offset-normalized particular respective match patch; and comparing the reference patch vector to each particular respective match patch vector.

* * * * *